US012472337B2

(12) United States Patent
Cully

(10) Patent No.: US 12,472,337 B2
(45) Date of Patent: Nov. 18, 2025

(54) ATRAUMATIC REMOVABLE CELL ENCAPSULATION DEVICES

(71) Applicant: W. L. Gore & Associates, Inc., Newark, DE (US)

(72) Inventor: Edward H. Cully, Newark, DE (US)

(73) Assignee: W. L. Gore & Associates, Inc., Newark, DE (US)

( * ) Notice: Subject to any disclaimer, the term of this patent is extended or adjusted under 35 U.S.C. 154(b) by 532 days.

(21) Appl. No.: 17/754,556

(22) PCT Filed: Oct. 15, 2019

(86) PCT No.: PCT/US2019/056290
§ 371 (c)(1),
(2) Date: Apr. 5, 2022

(87) PCT Pub. No.: WO2021/076105
PCT Pub. Date: Apr. 22, 2021

(65) Prior Publication Data
US 2024/0050725 A1 Feb. 15, 2024

(51) Int. Cl.
*A61M 37/00* (2006.01)
(52) U.S. Cl.
CPC .................................. *A61M 37/00* (2013.01)
(58) Field of Classification Search
CPC ....... A61M 37/00; A61F 2/022; A61F 2/0077; A61F 2002/0086
See application file for complete search history.

(56) References Cited

U.S. PATENT DOCUMENTS 6,060,640 A * 5/2000 Pauley ................... A61F 2/022
623/1.41
7,166,074 B2 1/2007 Reghabi
(Continued)

FOREIGN PATENT DOCUMENTS

AU 2013237748 A1 10/2013
CN 104363834 A 2/2015
(Continued)

OTHER PUBLICATIONS

International Search Report and Written Opinion issued in PCT/US2019/056290, mailed Jun. 24, 2020, 19 pages.

*Primary Examiner* — Nilay J Shah

(57) ABSTRACT

A therapeutic device includes a pouch having opposed first and second ends and first and second composite layers extending between the opposed first and second ends. The first composite layer includes a first cell permeable layer extending between the opposed first and second ends and a first cell retentive layer extending between the opposed first and second ends. The pouch includes a reservoir formed between the first and second composite layers, contacting the first cell retentive layer, and at least one port in fluid communication with the reservoir. The therapeutic device further includes a removal element configured to operably engage the first end of the pouch, to cause the first end to be moveable towards the second end by eversion. In some embodiments, each of the first and second composite layers includes a plurality of wrinkles that are incrementally disengaged from a tissue to remove the therapeutic device atraumatically.

10 Claims, 7 Drawing Sheets

(56) References Cited

U.S. PATENT DOCUMENTS

2013/0338638 A1* 12/2013 Cully ............... A61B 17/12131
  604/509
2017/0113028 A1    4/2017 So
2018/0125632 A1*  5/2018 Cully ...................... A61L 27/36
2018/0126134 A1*  5/2018 Cully ................... A61L 31/146
2018/0318360 A1  11/2018 Shikanov
2018/0318566 A1  11/2018 Ferrante
2019/0224377 A1*  7/2019 Papas ..................... A61K 39/39

FOREIGN PATENT DOCUMENTS

| | | |
|---|---|---|
| CN | 104363839 A | 2/2015 |
| CN | 110167607 A | 8/2019 |
| EP | 3399945 A1 | 11/2018 |
| EP | 3534834 A1 | 9/2019 |
| JP | 6234485 B2 | 4/2016 |

\* cited by examiner

ATRAUMATIC REMOVABLE CELL ENCAPSULATION DEVICES

FIELD

The present disclosure relates to implantable biological devices, and more particularly, to implantable encapsulation devices that may be atraumatically removed.

BACKGROUND

Biological therapies are increasingly viable methods for treating peripheral artery disease, aneurysm, heart disease, Alzheimer's and Parkinson's diseases, autism, blindness, diabetes and other pathologies. With respect to biological therapies in general, cells, viruses, viral vectors, bacteria, proteins, antibodies and other bioactive moieties may be introduced into a patient by surgical or interventional methods that place the bioactive moiety into a tissue bed of a patient. Often the bioactive moieties are first placed in a device that is then inserted into the patient. Alternatively, the device may be inserted into the patient first with the bioactive moiety added later.

These devices are often implanted temporarily into the patient. However, even temporary devices have tissue ingrowth that can make removing the devices from the surrounding tissue difficult. Conventional removal of the devices, for example, by cutting the surrounding tissue, can be traumatic to the tissue. In addition, these procedures may result in patient discomfort as well as the inability to re-use the same tissue for future procedures. Thus, there is a need for implantable devices that encapsulate cells and/or other biological moieties, where the devices are atraumatically removable from a patient.

SUMMARY

The terms "disclosure," "the disclosure," "this disclosure" and "the present disclosure," as used in this document, are intended to refer broadly to all of the subject matter of this patent application and the claims below. Statements containing these terms should be understood to not limit the subject matter described herein or to limit the meaning or the scope of the patent claims below. This summary is a high-level overview of various aspects of the disclosure and introduces some of the concepts that are further detailed in the Detailed Description section below. This summary is not intended to identify key or essential features of the claimed subject matter, nor is it intended to be used in isolation to determine the scope of the claimed subject matter. The subject matter should be understood by reference to the appropriate portions of the entire specification, any or all drawings, and each claim. Embodiments of the present disclosure relate to therapeutic devices that include a pouch having opposed first and second ends. The pouch includes first and second composite layers extending between the opposed first and second ends. The first composite layer includes a first cell permeable layer extending between the opposed first and second ends and a first cell retentive layer extending between the opposed first and second ends. The pouch also includes a reservoir positioned between the first and second composite layers, the reservoir contacting the first cell retentive layer. The pouch also includes at least one port in fluid communication with the reservoir. The pouch also includes a removal element configured to operably engage the first end of the pouch, so as to cause the first end to be moveable towards the second end of the pouch by eversion.

In some embodiments, each of the first and second composite layers comprises a plurality of wrinkles.

In some embodiments, first cell permeable layer has a pore size sufficient to permit growth of vascular tissue therethrough.

In some embodiments, the pore size is greater than 5.0 microns as measured by porometry.

In some embodiments, the first cell retentive layer has a pore size sufficient to prevent ingrowth of vascular tissue.

In some embodiments, the pore size is less than 1 micron, as measured by porometry.

In some embodiments, at least one of the first cell permeable layer and the first cell retentive layer comprises an expanded fluoropolymer.

In some embodiments, the second composite layer comprises a second cell permeable layer extending between the opposed first and second ends and a second cell retentive layer extending between the opposed first and second ends.

Embodiments of the present disclosure also relate to a method including engaging a removal element configured to operably engage a first end of a therapeutic device implanted in a tissue pocket, wherein the implanted therapeutic device and the tissue pocket define a plane. The method also includes exerting a tensile force on the removal element in a first direction parallel to the plane. The method also includes moving the removal element along the first direction to move a first end of the implanted therapeutic device towards a second end of the implanted therapeutic device opposite the first end such that the implanted therapeutic device is peeled away from the tissue pocket, wherein the moving step everts the implanted therapeutic device to remove the implanted therapeutic device from the tissue pocket atraumatically.

In some embodiments, the therapeutic device includes a pouch including opposed first and second ends. The pouch includes first and second composite layers extending between the opposed first and second ends. The first composite layer includes a first cell permeable layer extending between the opposed first and second ends. The first composite layer also includes a first cell retentive layer extending between the opposed first and second ends. The pouch also includes a reservoir formed between the first and second composite layers. The reservoir contacts the first cell retentive layer. The pouch also includes at least one port in fluid communication with each reservoir. The therapeutic device also includes a removal element configured to operably engage the first end of the pouch, so as to cause the first end to be moveable towards the second end by eversion.

In some embodiments, each of the first composite layer and the second composite layer comprises a plurality of wrinkles.

In some embodiments, the method further includes moving the therapeutic device from a first relaxed state in which the plurality of wrinkles formed the at least one of the first composite layer and the second composite layer engages tissue in a tissue pocket, to a second extended state, in which at least some of the plurality of wrinkles are stretched apart, so as to disengage a portion of the tissue from the at least some wrinkles. The moving step includes a plurality of discrete individual movements, whereby the tissue is incrementally disengaged from the plurality of wrinkles of the pouch so that the pouch is removed from the tissue pocket atraumatically.

In some embodiments, the second composite layer comprises a second cell permeable layer extending between the opposed first and second ends and a second cell retentive layer extending between the opposed first and second ends.

Embodiments of the present disclosure also relate to a therapeutic device including opposed first and second ends, wherein the opposed first and second ends define a longitudinal axis therebetween. The therapeutic device also includes a first composite layer extending between the first and second ends. The first composite layer includes a first plurality of wrinkles. The therapeutic device also includes a second composite layer extending between the first and second ends. The second composite layer includes a second plurality of wrinkles. The therapeutic device also includes a reservoir formed between the first and second composite layers, the reservoir having a length, a width and a depth. The therapeutic device also includes at least one port in fluid communication with the reservoir. The therapeutic device is moveable between a first relaxed state, in which the first plurality of wrinkles and the second plurality of wrinkles extend in a direction generally perpendicular to the longitudinal axis, and a second extended state, in which the first plurality of wrinkles and the second plurality of wrinkles are configured to be stretched between the first and second ends, so as to be generally parallel with the longitudinal axis.

In some embodiments, at least one of the first composite layer and the second composite layer comprises a cell permeable layer extending between the opposed first and second ends and a cell retentive layer extending between the opposed first and second ends.

Embodiments of the present disclosure also relate to method including engaging a first end of a therapeutic device implanted in a tissue pocket, wherein the implanted therapeutic device and the tissue pocket define a plane. The method also includes exerting a tensile force on the first end in a first direction parallel to the plane to move the therapeutic device from a first relaxed state in which a plurality of wrinkles formed on the therapeutic device engages tissue in the tissue pocket, to a second extended state, in which at least some of the plurality of wrinkles are stretched apart, so as to disengage a portion of the tissue from the at least some wrinkles. The moving step includes a plurality of discrete individual movements, whereby the tissue is incrementally disengaged from the plurality of wrinkles of the pouch so that the pouch is removed from the tissue pocket atraumatically.

In some embodiments, the therapeutic device includes opposed first and second ends. The opposed first and second ends define a longitudinal axis therebetween. The therapeutic device also includes a first composite layer extending between the first and second ends. The first composite layer includes a first plurality of wrinkles. The therapeutic device also includes a second composite layer extending between the first and second ends. The second composite layer includes a second plurality of wrinkles. The therapeutic device also includes a reservoir formed between the first and second composite layers, the reservoir having a length, a width and a depth. The therapeutic device also includes at least one port in fluid communication with the reservoir. The therapeutic device is moveable between the first relaxed state, in which the first plurality of wrinkles and the second plurality of wrinkles extend in a direction generally perpendicular to the longitudinal axis, and the second extended state, in which the first plurality of wrinkles and the second plurality of wrinkles are configured to be stretched between the first and second ends, so as to be generally parallel with the longitudinal axis.

In some embodiments, at least one of the first composite layer and the second composite layer comprises a cell permeable layer extending between the opposed first and second ends and a cell retentive layer extending between the opposed first and second ends.

In some embodiments, at least one of the first composite layer and the second composite layer is a cell permeable layer.

In some embodiments, at least one of the first composite layer and the second composite layer is a cell retentive layer.

BRIEF DESCRIPTION OF THE DRAWINGS

The accompanying drawings are included to provide a further understanding of the disclosure and are incorporated in and constitute a part of this specification, illustrate embodiments, and together with the description serve to explain the principles of the present disclosure.

DETAILED DESCRIPTION

Figure 1:
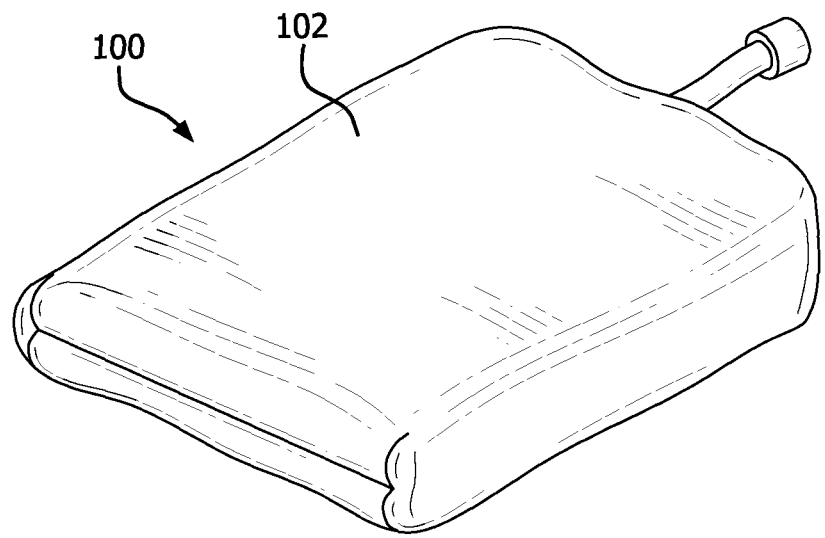
FIG. 1 is a perspective view showing a therapeutic device in accordance with embodiments described herein.

Persons skilled in the art will readily appreciate that various aspects of the present disclosure can be realized by any number of methods and apparatus configured to perform the intended functions. It should also be noted that the accompanying drawing figures referred to herein are not necessarily drawn to scale, but may be exaggerated to illustrate various aspects of the present disclosure, and in that regard, the drawing figures should not be construed as limiting. In addition, the term "therapeutic device" and "device" may be used interchangeably herein. It is to be appreciated that the term "therapeutic device" may also be used interchangeably with term "cell containment device" herein.

Described herein are therapeutic devices for encapsulating biological moieties where the biological devices are implanted into a patient, such as into a tissue bed, to provide biological therapy. Therapeutic devices may include a cell encapsulation device, a drug delivery device, or a gene therapy device. Also described herein are methods for forming the devices and for introducing the biological moieties into the devices. In some embodiments, the therapeutic device is a pouch formed of composite layers. Each of the composite layers has a porous polymeric layer for the retention of biological moieties and a porous layer that enables vascularization. The cell retentive and cell permeable layers have different porosities, and may include or be formed of the same material or different materials. In some embodiments, the cell retentive layer has a porosity that is less than the porosity of the cell permeable layer. The composite layers are spaced apart from one another to define at least one reservoir space for the retention of biological moieties.

In some embodiments, biological moieties suitable for encapsulation and implantation using the devices described herein include cells, viruses, viral vectors, gene therapies, bacteria, proteins, polysaccharides, antibodies and other bioactive moieties. For simplicity, hereafter the biological moiety is referred to as a cell, but nothing in this description limits the biological moieties to cells or to any particular type of cell, and the following description applies also to biological moieties that are not cells. In some embodiments, various types of prokaryotic cells, eukaryotic cells, mammalian cells, non-mammalian cells, and/or stem cells may be used with the cell encapsulation devices of the present disclosure.

In some embodiments, the cells are microencapsulated within a biomaterial of natural or synthetic origin, including, but not limited to, a hydrogel material. In some embodiments, the cells secrete a therapeutically useful substance. In some embodiments, such substances include hormones, growth factors, trophic factors, neurotransmitters, lymphokines, antibodies, or other cell products which provide a therapeutic benefit to the device recipient. Examples of such therapeutic cell products include, but are not limited to, insulin, growth factors, interleukins, parathyroid hormone, erythropoietin, transferrin, and Factor VIII. In some embodiments, non-limiting examples of suitable growth factors include vascular endothelial growth factor, platelet-derived growth factor, platelet-activating factor, transforming growth factors, bone morphogenetic protein, activin, inhibin, fibroblast growth factors, granulocyte-colony stimulating factor, granulocyte-macrophage colony stimulating factor, glial cell line-derived neurotrophic factor, growth differentiation factor-9, epidermal growth factor and combinations thereof. It is to be appreciated that throughout this disclosure the terms "cell" or "cells" could be replaced by "biological moiety" or "biological moieties," respectively.

I. Therapeutic Device Atraumatically Removable by Eversion

An eversion method for removing a therapeutic device for encapsulating cells is described herein. In some embodiments, the therapeutic device is implanted into a tissue of a patient to be treated. After the treatment is complete, or when removal is otherwise required, the therapeutic device may be removed from the tissue of the patient by a tensile force to minimize or avoid trauma to the tissue integrated into device and/or surrounding the device. In at least one embodiment, a removal element of the device is engaged, for example, by a device removal tool. A tensile force is exerted on the removal element by the device removal tool such that a first end of the therapeutic device is everted inwardly through itself toward a second end of the therapeutic device. As the first end of the therapeutic device is pulled toward the second end, the therapeutic device is atraumatically removed (e.g., peeled) from the surrounding tissue and may then be withdrawn from of the patient. As used herein, "atraumatically removed" is meant to denote removal that minimizes or avoids trauma to tissue.

Figure 2:
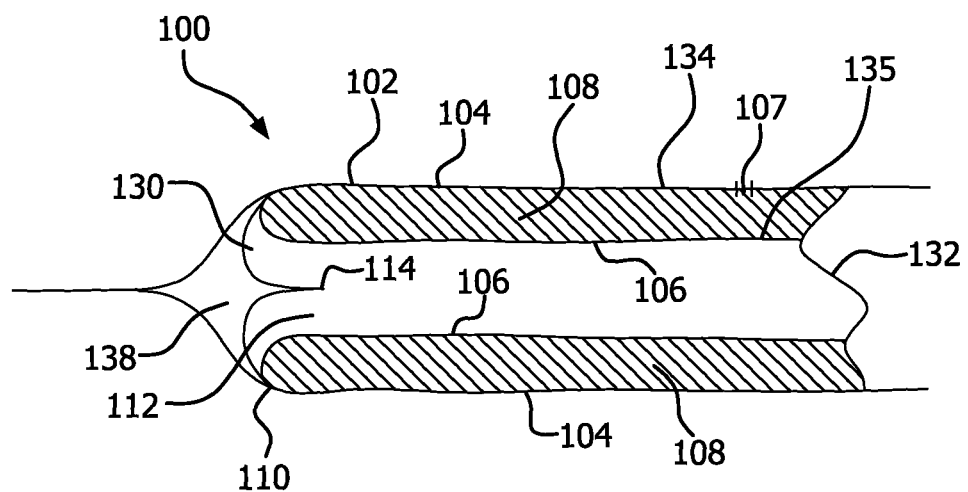
FIG. 2 is a cross-sectional view showing the therapeutic device of FIG. 1 within a tissue pocket in accordance with embodiments described herein.

One embodiment of a therapeutic device for encapsulating cells is illustrated in FIGS. 1-6. The therapeutic device is scalable in that it can easily be configured throughout a range of sizes (e.g., perimeters) so that the device can be used to house cells while ensuring both the survival and function of these cells. According to an embodiment, the therapeutic device 100 includes a pouch 102 and a removal element 114 attached thereto. The pouch 102 extends from a first end 130 to a second end 132. In some embodiments, the pouch 102 may be tubular in shape. However, the pouch may be any other shape, such as, for example, substantially planar, depending on the anatomical location of the implant. The pouch 102 includes a first composite layer 104 and a second composite layer 106. A reservoir 108 is formed between the first and second composite layers 104, 106. The reservoir 108 is a contained space where cells are housed and is accessible by at least one port 107, which is in fluid communication with the reservoir 108. A periphery 110 of the pouch 102 is sealed up to the location of the port 107. In an exemplary embodiment, a lumen 112 extends through the pouch 102, as depicted in FIG. 2. It is to be noted that the figures show a lumen 112 with a diameter that is exaggerated to show a device removal tool reaching therethrough. However, the device removal tool may only need to slip through the lumen 112 and thus, the lumen 112 does not need to be held "open". Furthermore, the diameter may be just large enough for the device removal tool to be inserted therein. In some embodiments, the tool will create its own space through the lumen 112 as it is inserted therethrough. The removal element 114 of the therapeutic device 100 is attached to the first end 130 of the pouch 102 for atraumatic removal of the therapeutic device 100 by eversion.

Figure 6:
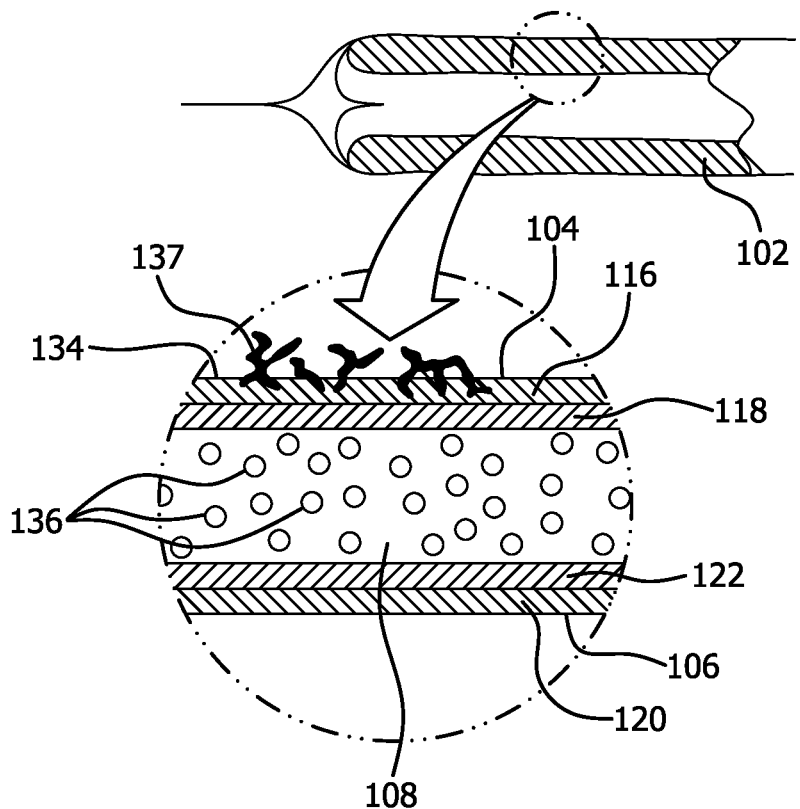
FIG. 6 is an enlarged cross-sectional view showing a portion of the therapeutic device of FIG. 1 after vascularization in accordance with embodiments described herein.
Figure 7:
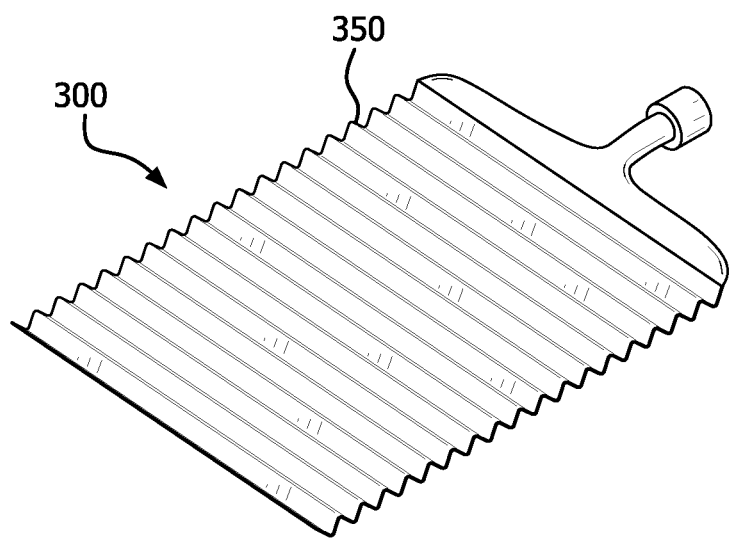
FIG. 7 is a perspective view showing a therapeutic device including wrinkles in accordance with embodiments described herein.

As depicted in FIG. 6, in some embodiments, the first composite layer 104 is a composite layer that includes a cell permeable layer 116 and a cell retentive layer 118 disposed adjacent to the cell permeable layer 116. Similarly, the second composite layer 106 is a composite layer that also includes a cell permeable layer 120 and a cell retentive layer 122. The cell retentive polymeric layer is impervious to cell ingrowth. The cell permeable layer permits the growth of vascular tissue into and through the pores of the cell permeable layer as far as the cell retentive layer. In some embodiments, the cell permeable layers 116, 120 of the first and second composite layers 104, 106, respectively, are formed of the same material. In other embodiments, the cell permeable layers 116, 120 are formed of different materials. Both of the cell permeable layers 116, 120, are cell permeable layers that are sufficiently porous to permit the growth of vascular tissue 137 from a patient into and through the pores of the cell permeable layers 116, 120, as depicted in FIG. 6. The ingrowth of vascular tissues through the cell permeable layer facilitates nutrient transfer from the patient to the cells encapsulated in the therapeutic device. However, ingrowth of vascular tissues does not extend through the cell retentive layer.

In some embodiments, the cell permeable layer 116, 120 have an average pore size of less than 5 microns. In other embodiments, the average pore size of the cell permeable layers 116, 120 is from 5 microns to 30 microns, as measured by porometry. In other embodiments, the average pore size of the cell permeable layers 116, 120 is from 7 microns to 30 microns. In other embodiments, the average pore size of the cell permeable layers 116, 120 is from 10 microns to 30 microns. In other embodiments, the average pore size of the cell permeable layers 116, 120 is from 15 microns to 30 microns. In other embodiments, the average pore size of the cell permeable layers 116, 120 is from 25 microns to 30 microns.

In other embodiments, the average pore size of the cell permeable layers 116, 120 is from 5 microns to 25 microns. In other embodiments, the average pore size of the cell permeable layers 116, 120 is from 5 microns to 20 microns. In other embodiments, the average pore size of the cell permeable layers 116, 120 is from 5 microns to 15 microns. In other embodiments, the average pore size of the cell permeable layers 116, 120 is from 5 microns to 10 microns. In other embodiments, the average pore size of the cell permeable layers 116, 120 is from 5 microns to 7 microns. In other embodiments, the average pore size of the cell permeable layers 116, 120 is from 7 microns to 15 microns. In other embodiments, the average pore size of the cell permeable layers 116, 120 is from 10 microns to 27 microns. In other embodiments, the average pore size of the cell permeable layers 116, 120 is from 12 microns to 15 microns. In other embodiments, the average pore size of the cell permeable layers 116, 120 is from 17 microns to 25 microns.

Various cell types can grow into the cell permeable layers of a porous material of the therapeutic device 100 as described herein. The predominant cell type that grows into a porous material depends primarily on the implantation site, the composition and permeability of the material, and any biological factors, such as, for example, cytokines and/or cell adhesion molecules that may be incorporated in the material or introduced through porous material(s). In some embodiments, vascular endothelium is the predominant cell type that grows into a porous material for use in a cell encapsulation device. Vascularization of the porous material by a well-established population of vascular endothelial cells in the form of a capillary network 137, as depicted in FIG. 6, is encouraged to occur as a result of neovascularization of the material from tissues of a patient into and across the thickness of the material very close to the interior surface of the device 100, but not across the cell retentive layer.

The cell retentive layer and the cell permeable layer should each be compliant enough to allow the therapeutic device to fold on itself during the eversion process. Thus, in some embodiments, vascularization of the cell permeable layer is permitted only to a predetermined degree so as to not interfere with the compliance of the therapeutic device.

The cell retentive layers 118, 122 are impervious to cell ingrowth and thus, are cell retentive layers. Both cell retentive layers 118, 122 have an average pore size that is sufficiently small so as to prevent vascular ingrowth.

In some embodiments, the average pore size of the cell retentive layers 118, 122 is less than 5 microns. In some embodiments, the average pore size of the cell retentive layers 118, 122 is from 0.001 microns to 5 microns, as measured by porometry. In other embodiments, the average pore size of the cell retentive layers 118, 122 is from 0.001 microns to 0.5 microns. In other embodiments, the average pore size of the cell retentive layers 118, 122 is from 0.001 microns to 0.1 microns. In other embodiments, the average pore size of the cell retentive layers 118, 122 is from 0.001 microns to 0.05 microns. In other embodiments, the average pore size of the cell retentive layers 118, 122 is from 0.001 microns to 0.01 microns. In other embodiments, the average pore size of the cell retentive layers 118, 122 is from 0.005 microns to 0.001 microns. In other embodiments, the average pore size of the cell retentive layers 118, 122 is from 0.001 microns to 0.002 microns.

In other embodiments, the average pore size of the cell retentive layers 118, 122 is from 0.005 microns to 5 microns. In other embodiments, the average pore size of the cell retentive layers 118, 122 is from 0.01 microns to 5 microns. In other embodiments, the average pore size of the cell retentive layers 118, 122 is from 0.05 microns to 5 microns. In other embodiments, the average pore size of the cell retentive layers 118, 122 is from 0.1 microns to 5 microns. In other embodiments, the average pore size of the cell retentive layers 118, 122 is from 0.5 microns to 5 microns.

In other embodiments, the average pore size of the cell retentive layers 118, 122 is from 0.01 microns to 0.5 microns. In other embodiments, the average pore size of the cell retentive layers 118, 122 is from 0.005 microns to 0.2 microns. In other embodiments, the average pore size of the cell retentive layers 118, 122 is from 0.25 microns to 0.75 microns. In other embodiments, the average pore size of the cell retentive layers 118, 122 is from 0.1 microns to 0.2 microns. In other embodiments, the average pore size of the cell retentive layers 118, 122 is from 0.015 microns to 0.045 microns.

A small pore size allows the cell retentive layers 118, 122 to function as cell retentive layers to keep cells disposed in the reservoir 108 inside the therapeutic device 100. However, this small pore size allows nutrients and other biomolecules to enter and cell waste and therapeutic products to exit. These cell retentive layers 118, 122 are referred to as cell retentive layers.

In some embodiments, the cell permeable layers 116, 120 and/or the cell retentive layers 118, 122 include, but are not limited to, alginate, cellulose acetate, polyalkylene glycols such as polyethylene glycol and polypropylene glycol, panvinyl polymers such as polyvinyl alcohol, chitosan, polyacrylates such as polyethylene-co-acrylic acid, agarose, hydrolyzed polyacrylonitrile, polyacrylonitrile copolymers, polyvinyl acrylates such as polyethylene-co-acrylic acid, porous polytetrafluoroethylene (PTFE), porous modified polytetrafluoroethylene polymers, porous tetrafluoroethylene (TFE) copolymers, porous polyalkylenes such as porous polypropylene and porous polyethylene, porous polyvinylidene fluoride, porous polyester sulfone (PES), porous polyurethanes, porous polyesters, and copolymers and combinations thereof. In some embodiments, materials useful as one or both of the cell permeable layer(s) include biomaterial textiles.

In some embodiments, the cell permeable layers 116, 120 and/or the cell retentive layers 118, 122 may include porous polyvinylidene fluoride (PVDF) as taught in U.S. Pat. No. 9,441,088 to Sbriglia et al., porous poly (p-xylylene) (ePPX) as taught in U.S. Patent Publication No. 2016/0032069 to Sbriglia, porous ultra-high molecular weight polyethylene (eUHMWPE) as taught in U.S. Pat. No. 9,926,416 to Sbriglia, porous ethylene tetrafluoroethylene (eETFE) as taught in U.S. Pat. No. 9,932,429 to Sbriglia, vinylidene fluoride-co-tetrafluoroethylene or trifluoroethylene [VDF-co-(TFE or TrFE)] polymers as taught in U.S. Pat. No. 9,441,088 to Sbriglia, and copolymers and combinations thereof, as well as woven or non-woven collections of fibers or yarns, or fibrous matrices, either alone or in combination.

In some embodiments, the cell permeable layers 116, 120 and/or the cell retentive layers 118, 122 are expanded fluoropolymer membranes. For example, the cell permeable layers 116, 120 and/or the cell retentive layers 118, 122 may include expanded polytetrafluoroethylene (ePTFE) or expanded modified polytetrafluoroethylene. In some embodiments, the cell permeable layers 116, 120 and/or the cell retentive layers 118, 122 are expanded polytetrafluoroethylene membranes (e.g., an ePTFE membrane).

In some embodiments, one or both of the cell retentive layers 118, 122 and the cell permeable layers 116, 120 of the therapeutic device 100 is made, primarily or entirely, of a porous material having selective sieving and/or porous properties. In some embodiments, the porous material controls the passage of solutes, biochemical substances, viruses and cells, for example, through the material, primarily based on size. Non-limiting example of porous materials include, but are not limited to, one or more of the materials set forth above for the inner and outer layers, including biomaterial textiles.

In an embodiment, the therapeutic device 100 does not include composite layers. Instead, the therapeutic device includes first and second cell permeable layers. In such an embodiment, the cells to be inserted into the therapeutic device 100 are microencapsulated, which provides isolation for the cells from the host immune response but allows the cells to receive nutrients, etc. (e.g., the cells are able to obtain nutrients and other biomolecules from the environment outside of the device 100 and expel waste products and therapeutic substances). In some embodiments, the cells may be microencapsulated within a biomaterial of natural or synthetic origin including, but not limited to, a hydrogel.

Turning to FIG. 6, and as noted above, the reservoir 108 is formed between the first composite layer 104 and the second composite layer 106 of the pouch 102. Specifically, the reservoir 108 is formed between the cell retentive layers 118, 122 of the pouch 102. As used herein, the term "reservoir" is meant to define the total area within the therapeutic device 100 between a first cell retentive layer and a second cell retentive layer and within the periphery of the therapeutic device 100 where the placement of cells (or where the cells reside). The reservoir 108 may take numerous configurations such as, for example, a lane or a geometric shape (e.g., the general form of a rectangle, circle, square, semi-circle, semi-oval, etc.).

The reservoir 108 is configured to hold cells 136 within the therapeutic device 100, as depicted in FIG. 6, to allow the cells to secrete a therapeutically useful substance which provides biological therapy to a patient. In some embodiments, the cells 136 are introduced into the reservoir 108 of the therapeutic device 100 through one or more port(s) 107 that are fluidly connected to the reservoir 108. The port(s) 107 may be positioned anywhere along the perimeter of the therapeutic device 100, so long as they are in fluid communication with the reservoir 108 and accessible from an exterior of the therapeutic device 100. In some embodiments, the port(s) 107 is located at a periphery of the therapeutic device 100. In some embodiments, the port(s) 107 extend through the sealed periphery between the first composite layer 104 and the second composite layer 106 of the sealed pouch 102 so that the cells are introduced into the reservoir 108 of the pouch 102 through an opening of the pouch material.

In some embodiments, the cells 136 are introduced in the form of a suspension or slurry in a medium. The cells 136 may be individual cells, cell aggregates, or cell clusters. In some embodiments, the medium may be a cell culture or cell growth medium, optionally including desired nutrients and/or other biomolecules. In some embodiments, insertion of cells through the port 107 may be accomplished by a syringe.

The cells 136 may be introduced into the reservoir 108 prior to or after insertion of the therapeutic device 100 into a patient. For example, the therapeutic device 100 may be inserted into a patient and allowed to vascularize such that vascular tissue grows into a vascularizing layer of the device 100. The cells 136 may then be added while the therapeutic device 100 is in vivo. Alternatively, the cells 136 may be added to the therapeutic device 100 prior to insertion of the therapeutic device 100 into a tissue bed of the patient.

As previously noted, the therapeutic device 100, in some embodiments, includes a pouch 102. In some embodiments, the pouch may be tubular in shape. The pouch 102 includes a hollow lumen 112 extending therethrough from the first end 130 of the pouch 102 to the second end 132 of the pouch 102. As depicted in FIG. 6, an outer surface 134 of the cell permeable layer 116 of the first composite layer 104 forms an outer wall of the pouch 102. Additionally, the lumen 112 is defined by a lumen-facing surface 135 of the cell permeable layer 120 of the second layer 106, as depicted in FIG. 2.

Although FIGS. 1-6 depict a lumen 112 with an exaggerated perimeter relative to the size of the pouch 102, a perimeter of the lumen 112 may be very small or, in some embodiments, substantially nonexistent such that opposing sides of the lumen-facing surface 135 are touching. In some embodiments, the lumen 112 has a perimeter of, for example, from 1 mm to 10 mm. In other embodiments, the lumen has a perimeter of from 3 mm to 10 mm. In other embodiments, the lumen has a perimeter of from 5 mm to 10 mm. In other embodiments, the lumen has a perimeter of from 7 mm to 10 mm. In other embodiments, the lumen has a perimeter of from 9 mm to 10 mm.

In other embodiments, the lumen has a perimeter of from 1 mm to 9 mm. In other embodiments, the lumen has a perimeter of from 1 mm to 7 mm. In other embodiments, the lumen has a perimeter of from 1 mm to 5 mm. In other embodiments, the lumen has a perimeter of from 1 mm to 3 mm.

In other embodiments, the lumen has a perimeter of from 2 mm to 7 mm. In other embodiments, the lumen has a perimeter of from 5 mm to 8 mm. In other embodiments, the lumen has a perimeter of from 2 mm to 5 mm. In other embodiments, the lumen has a perimeter of from 7 mm to 9 mm.

Figure 3:
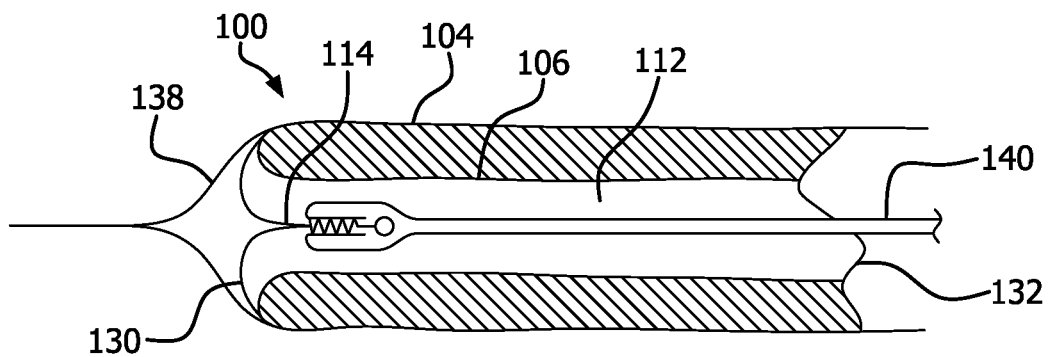
FIG. 3 is a cross-sectional view showing the therapeutic device of FIG. 1 with a removal tool exerting a tangential force on a removal element of the therapeutic device in accordance with embodiments described herein.
Figure 4:
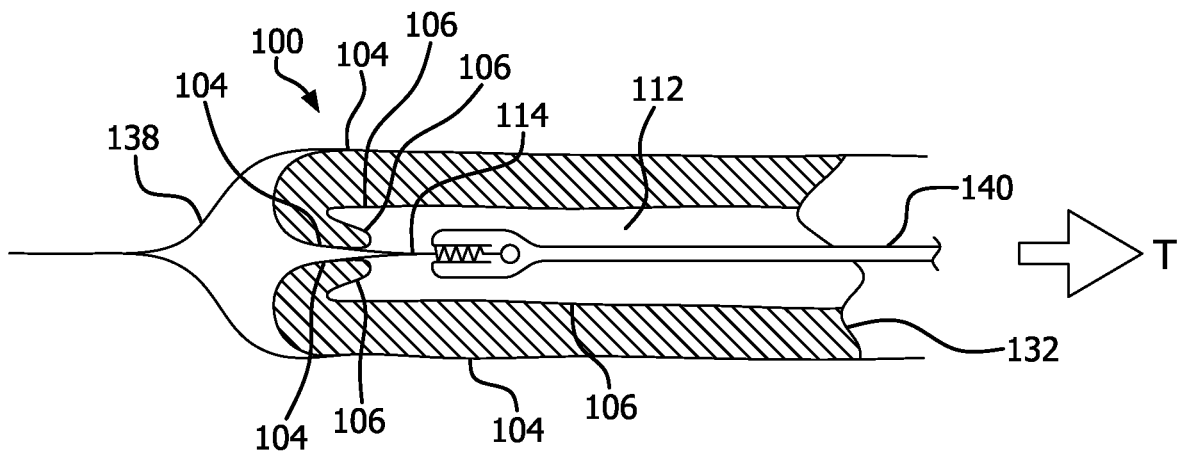
FIG. 4 is a cross-sectional view showing the therapeutic device of FIG. 1 and the removal tool of FIG. 3, where eversion of the therapeutic device is being initiated by the removal tool in accordance with embodiments described herein.
Figure 5:
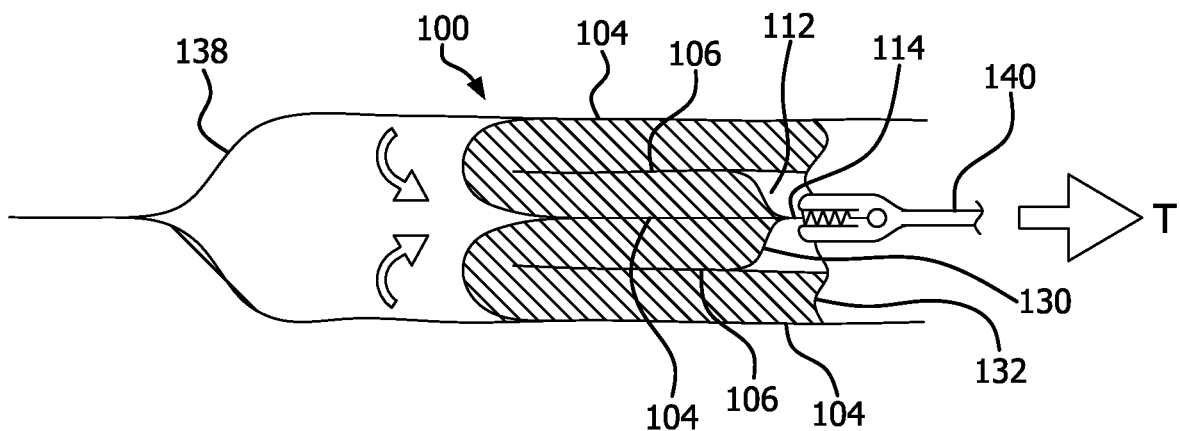
FIG. 5 is a cross-sectional view showing the therapeutic device of FIG. 1 and the removal tool of FIG. 3, where the therapeutic device is partially everted by the removal tool through a lumen extending therethrough in accordance with embodiments described herein.

In order to remove the therapeutic device 100 atraumatically, the device 100 includes a removal element 114 attached to the first end 130 of the pouch 102. The removal element 114 allows the therapeutic device 100 to be removed via a tangential force rather than a shear force, as will be described in further detail below. The removal element 114 may be any structure, integral or attached to the pouch 102, which will transmit a tensile force to the first end 130 of the pouch 102. In some embodiments, as depicted in FIGS. 1-4, the removal element 114 is a pull tab. In other embodiments, the removal element 114 comprises a filament, string, ribbon, tube, suture, sheet or other longitudinal element. The removal element 114 is biocompatible and may be metallic or a polymeric material. In some embodiments, the removal element 114 comprises ePTFE or another strong, inert, biocompatible material(s). The removal element 114, in some embodiments, is attached to the second composite layer 106 of the therapeutic device 100. In some embodiments, the removal element 114 is attached to the pouch by tying, adhesion or the use of fastener(s). In other embodiments, the removal element 114 is formed as an integral portion of the pouch 102. The integral removal element 114 may eliminate failure of the connection point between the pouch 102 and the removal element 114 in other modes of "attachment". In some embodiments, as depicted in FIGS. 3-5, the removal element 114 extends from the first end 130 of the pouch 102 and into the lumen 112 to be accessed by a device removal tool 140. Specifically, the device removal tool 140 is inserted into the lumen 112 from the second end 132 of the pouch 102 to grasp the removal element 114. Thus, a force may be exerted on the removal element 114 through the lumen 112 to cause the device 100 to be removed by eversion, as will be described in further detail below.

In a method of use, depicted in FIGS. 2-5, the therapeutic device 100 is implanted within a pocket of tissue 138 of the patient. The therapeutic device 100 may be implanted into the patient prior to or after the introduction of the cells 136 into the reservoir 108. Once the therapeutic device is no longer needed, the therapeutic device 100 is removed from the tissue of the patient by a tangential force to minimize or avoid trauma to the surrounding tissue of the patient. Specifically, the removal element 114 is engaged by the device removal tool 140 through the lumen 112, as depicted in FIG. 3. A tensile force is exerted on the removal element 114 by the device removal tool 140 such that the first end 130 of the pouch 102 is pulled into the lumen 112 toward the second end 132 of the pouch 102, as depicted in FIG. 4. As the device removal tool 140 is pulled further through the lumen 112 such that the first end 130 follows the device removal tool 140 through the lumen 112 towards the outside of the pouch 102, the pouch 102 is atraumatically removed (e.g., peeled) from the surrounding tissue of the patient and is finally everted through the lumen 112, as depicted in FIG. 5. Once the therapeutic device 100 is removed from the pocket of tissue 138, it can be withdrawn out of the patient by the device removal tool 140.

Although the embodiments of the present disclosure describe a therapeutic device that is everted through a lumen, further embodiments in which the therapeutic device may be everted in various other manners are contemplated and are considered to be within the purview of this disclosure. The therapeutic devices may take any other shape or form, so long as at least one surface of the therapeutic device is free—i.e., not attached to tissue. For example, in some embodiments of the present disclosure, the therapeutic device is substantially planar or patch-like, without a lumen extending therethrough. In this embodiment, a single surface of the therapeutic device is attached to tissue via vascularization while an opposing surface prevents tissue attachment and thus, is free or unattached to tissue. In this embodiment, a removal element is attached to the free surface such that the attached side may be peeled away from the tissue upon application of a tensile force to the removal element.

II. Therapeutic Device Removable by Wrinkles

In further embodiments, a method of removing a therapeutic device via a plurality of wrinkles incorporated in the therapeutic device is described herein. In some embodiments, the therapeutic device is implanted into, for example, a tissue of a patient. Once implanted, the therapeutic device is removed from the tissue by applying a tensile force to the removal element to minimize trauma to the surrounding tissue of the patient, such as is described in detail above. For instance, a second end of the therapeutic device may be engaged by a device removal tool and a tensile force is exerted on the second end to pull the second end in a direction away from a first end of the therapeutic device. As the second end is pulled in the direction of the tensile force, a first micro-wrinkle closest to the second end unfolds. As the device removal tool pulls the second end further away from the first end, each individual micro-wrinkle is unfolded one-by-one until the therapeutic device is atraumatically removed (e.g., peeled) from the surrounding tissue of the patient.

Figure 8:
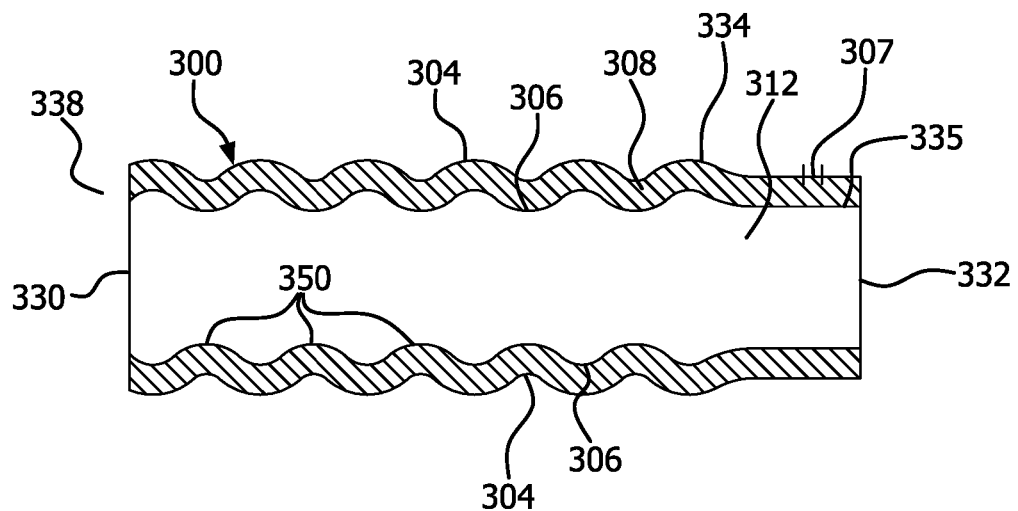
FIG. 8 is a cross-sectional view showing the therapeutic device of FIG. 7 within a tissue pocket in accordance with embodiments described herein.

FIGS. 7-14 depict an exemplary embodiment of a therapeutic device 300 extending from a first end 330 to a second end 332. The therapeutic device 300 includes a first composite layer 304 and a second composite layer 306 sealed along a portion of their periphery 310. A reservoir 308 is formed between the first and second composite layers 304, 306. The reservoir 308 is a contained space where cells are housed and is accessible by at least one port 307, which is in fluid communication with the reservoir 308. A periphery 310 of the therapeutic device 300 is sealed up to the location of the port 307. The port 307 extends through the sealed periphery 310 and is in fluid communication with the reservoir 308. In some embodiments, a lumen 312 extends through the therapeutic device 300, as depicted in FIG. 8.

Figure 14:
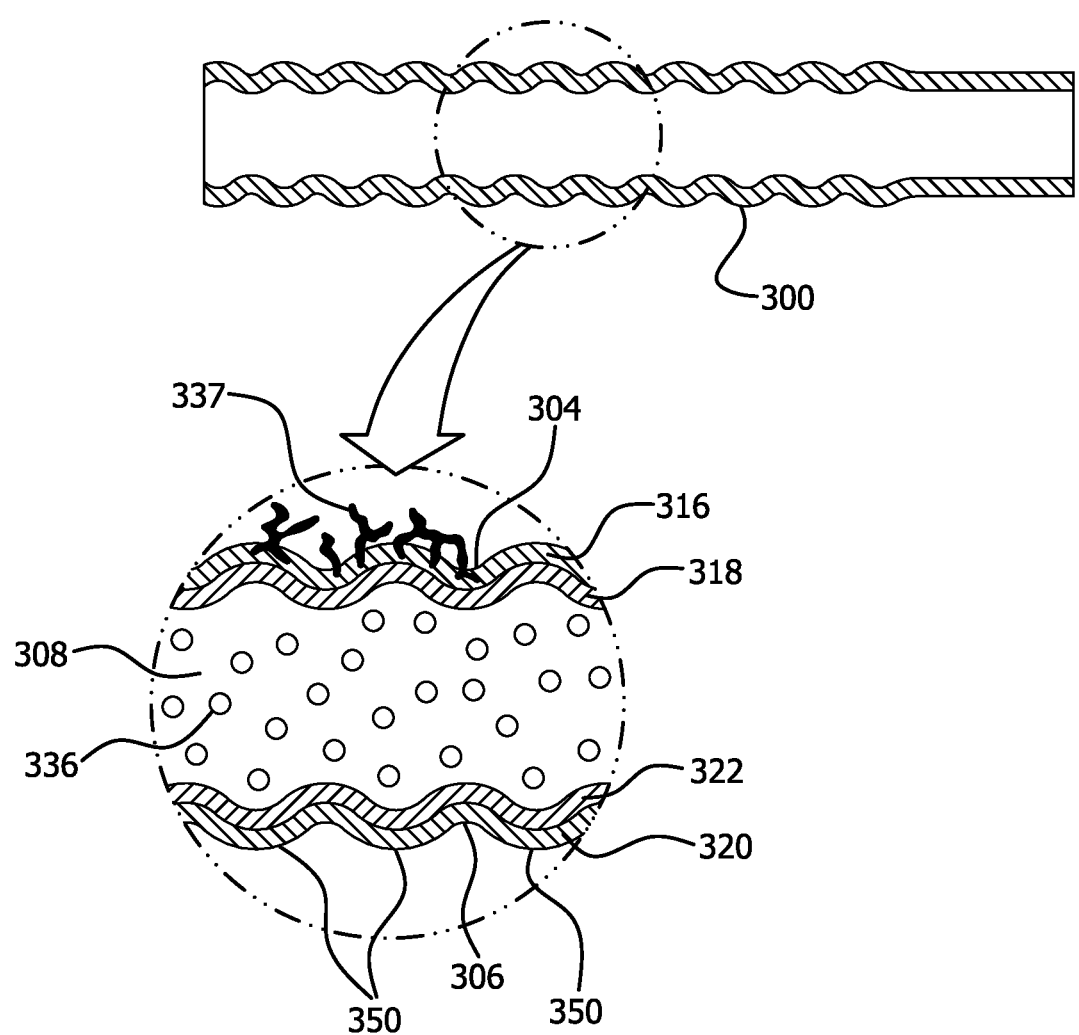
FIG. 14 is an enlarged cross-sectional view showing a portion of the therapeutic device of FIG. 7 in accordance with embodiments described herein.

The first and second composite layers 304, 306 may be formed in the same manner, and have the same characteristics of, the first and second composite layers 104, 106, described herein. In some embodiments, that first composite layer 304 is a composite layer that includes a cell permeable layer 316 and a cell retentive layer 318. In some embodiments, the second composite layer 306 includes a cell permeable layer 320 and a cell retentive layer 322. The cell permeable layers 316, 320 and the cell retentive layers 318, 322 may be formed in the same manner, and have the same characteristics of, the cell permeable layers 116, 120 and the cell retentive layers 118, 122, respectively. Specifically, as depicted in FIG. 14, the cell permeable layers 316, 320 are cell permeable layers which promote vascularization (i.e., form a capillary network 337) therethrough up to the cell retentive layers 319, 322 that are impervious to cell growth and vascularization. The cell retentive layers may be very thin so that the cells can still receive nutrients from the vascularization layers but vascularization stops at the interface of these two layers.

Figure 9:
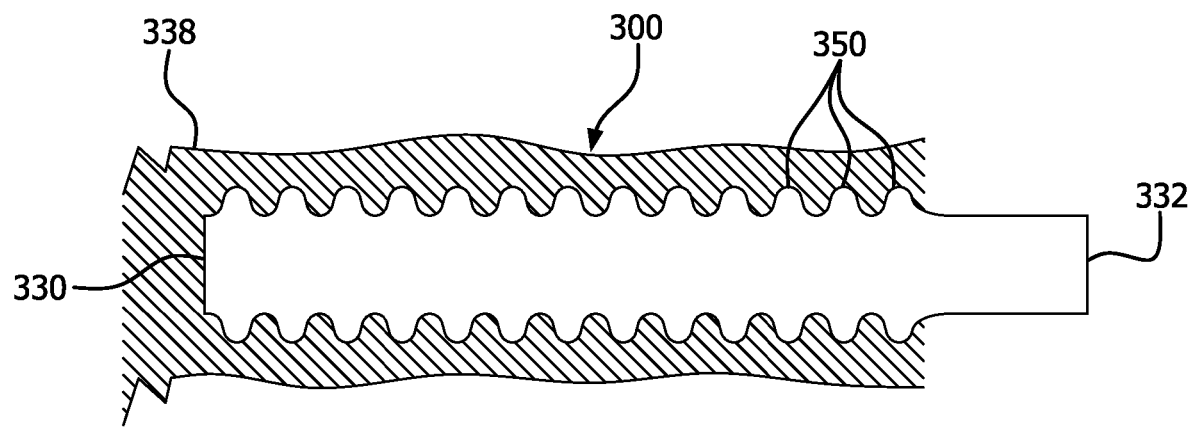
FIG. 9 is a cross-sectional view showing the therapeutic device of FIG. 7 within a tissue pocket in accordance with embodiments described herein.
Figure 10:
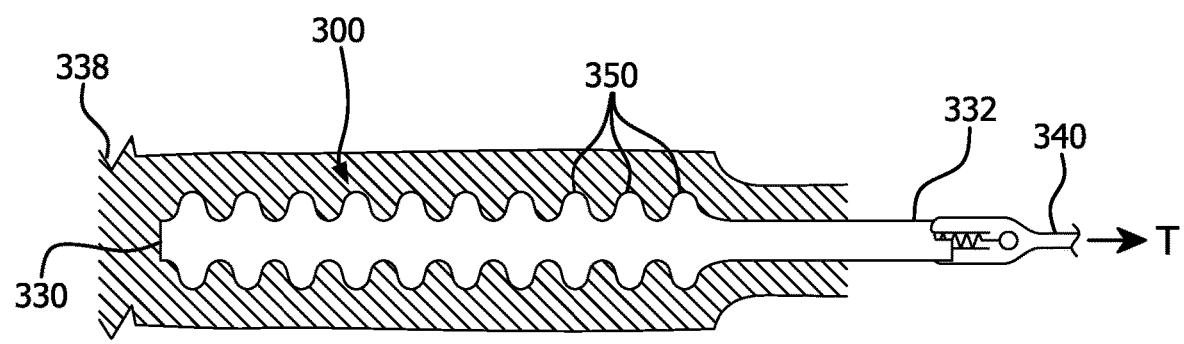
FIG. 10 is a cross-sectional view showing initiation of removal of the therapeutic device of FIG. 7 from the tissue pocket by a removal tool in accordance with embodiments described herein.
Figure 11:
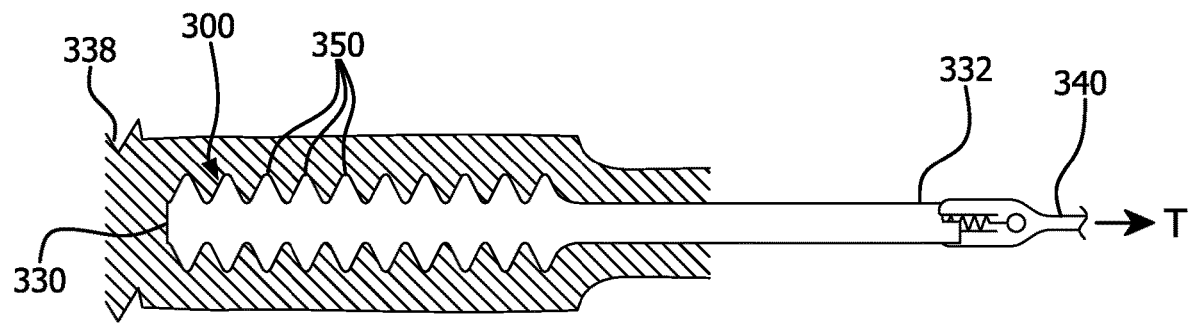
FIG. 11 is a cross-sectional view showing the therapeutic device of FIG. 7 partially removed from the tissue pocket by the removal tool of FIG. 10 in accordance with embodiments described herein.

As depicted in FIGS. 8-12, in an exemplary embodiment, each of the first and second composite layers 304, 306 includes a plurality of wrinkles 350. "Wrinkles," as defined herein, form a topographic pattern with alternating peaks and valleys. Because the first and second composite layers 304, 306 include these wrinkles 350, the therapeutic device 300 is moveable between a relaxed state, depicted in FIG. 9, in which the plurality of wrinkles extend in a direction generally perpendicular to a longitudinal axis of the therapeutic device 300 and an extended state in which the plurality of wrinkles are stretched between the first end 330 and the second end 332 so as to be generally parallel with the longitudinal axis of the therapeutic device 300. A partially extended state is depicted in FIG. 11. Specifically, as the second end 332 of the pouch 302 is pulled from the tissue bed, the tension applied to the therapeutic device 300 causes the wrinkles 350 to unfold, disconnecting the therapeutic device 300 from the tissue bed in which the therapeutic device 300 is implanted. This movement from the relaxed state to the extended states allows the removal of the therapeutic device 300 from a tissue bed of a patient with minimal trauma to the tissue in which the therapeutic device 300 is implanted. Furthermore, the plurality of wrinkles 350 may increase device effectiveness since the wrinkles increase effective surface area. The wrinkles 305, in some embodiments, may be formed according to the teachings of U.S. Pat. No. 9,849,629 to Zaggl et al.

In some embodiments where first and second composite layers 304, 306 are composite layers, only the outer layer comprises the plurality of wrinkles 350 overlying a non-wrinkled inner layer. In some embodiments, both the inner and outer layers comprise the plurality of wrinkles 350.

The reservoir 308 is formed between the first composite layer 304 and the second composite layer 306 of the therapeutic device 300. The reservoir 108 may take numerous configurations such as, for example, a planar or geometric shape (e.g., the general form of a rectangle, circle, square, semi-circle, semi-oval, etc.).

Figure 12:
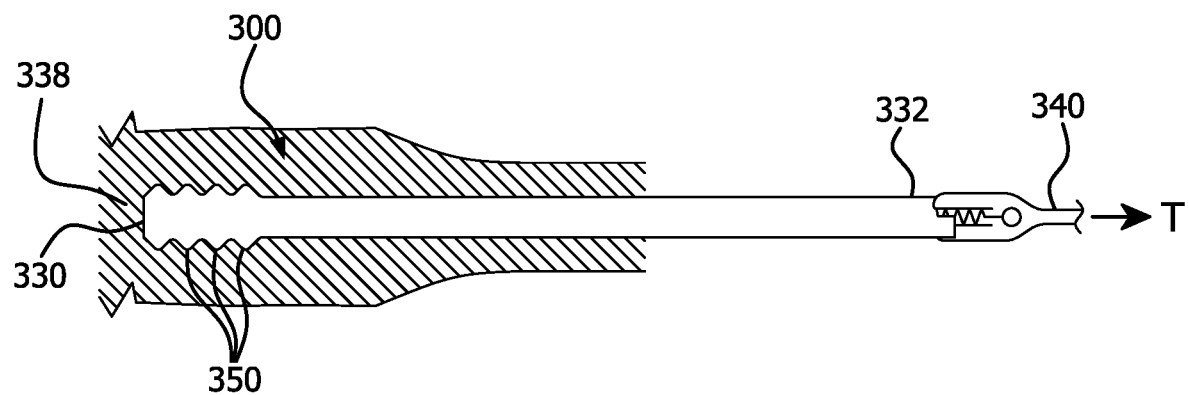
FIG. 12 is a cross-sectional view showing the removal tool of FIG. 10 and the therapeutic device of FIG. 7 in a partially removed state with approximately half of the wrinkles unfolded in accordance with embodiments described herein.

The reservoir 308 is configured to hold cells 336 within the therapeutic device 300 that is placed in a tissue bed of a patient, as depicted in FIG. 12, to allow the cells 336 to provide biological therapy to the patient. In some embodiments, the cells 336 are introduced into the reservoir 308 of the therapeutic device 300 through one or more port(s) 307. The port(s) 307, similar to port(s) 107, may be located anywhere along the therapeutic device 300, so long as they are in fluid communication with the reservoir 308. In some embodiments, the port(s) 307 extend through the sealed periphery between the first composite layer 304 and the second composite layer 306 of the sealed pouch 302 so that the cells 336 are introduced into the reservoir 308.

Figure 13:
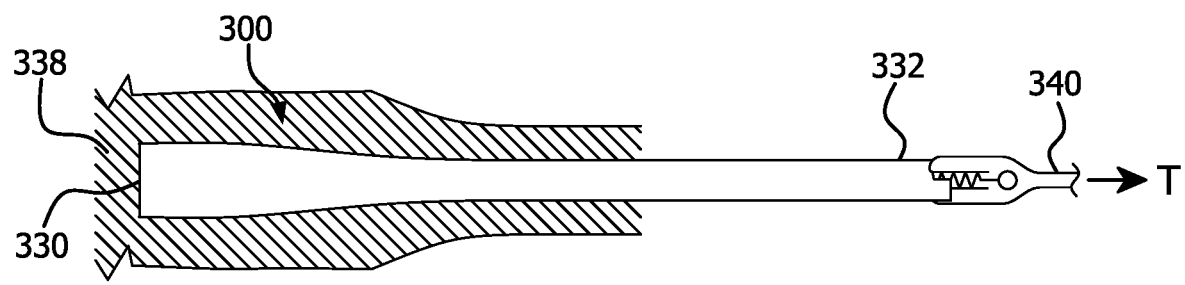
FIG. 13 is a cross-sectional view showing the removal tool of FIG. 10 and therapeutic device of FIG. 7 with all of the wrinkles unfolded in accordance with embodiments described herein.

In at least one embodiment where the therapeutic device 300 is used, the therapeutic device 300 is implanted within a pocket of tissue 338 of the patient, as depicted in FIG. 9. The therapeutic device 300 may be implanted into the patient prior to or after the introduction of the cells 336 into the reservoir 308 of the therapeutic device 300. When removal is deemed necessary or warranted, the therapeutic device 300 is removed from the tissue of a patient by application of a tensile force to minimize or reduce trauma to the tissue surrounding the device 300. In some embodiments, the second end 332 of the therapeutic device 300 is engaged by the device removal tool 340, as depicted in FIG. 10. The device removal tool 340 may be, for example, a snare, hemostat, etc., which allows for removal of the therapeutic device 100 from an end closest to the user. A tensile force (T) is exerted on the second end 332 by the device removal tool 340 such that the second end 332 of the therapeutic device 300 is pulled in a direction away from the first end 330 so that a first micro-wrinkle closest to the second end 332 unfolds, as depicted in FIG. 10. As the device removal tool 340 pulls the second end 332 further away from the first end 330, the wrinkles 350 are unfolded until the therapeutic device 300 is atraumatically peeled from the surrounding tissue of the patient, as depicted in FIG. 11-13.

III. Therapeutic Device Removable by Wrinkles and Eversion

In further embodiments, a method of removing a therapeutic device having a plurality of wrinkles via eversion is described. In some embodiments, the therapeutic device is implanted into, for example, a tissue of a patient. After the treatment is complete, or otherwise when removal is required, the therapeutic device may be removed from the tissue of the patient by a tangential force to minimize or avoid trauma to the tissue integrated into the therapeutic device. A removal element of the device is engaged, for example, by a device removal tool. A tensile force is exerted on the removal element by the device removal tool such that a first end of the therapeutic device is everted inwardly through itself toward a second end of the therapeutic device. As the first end is pulled in the direction of the tensile force, a first micro-wrinkle closest to the first end unfolds. As the device removal tool pulls the first end further toward the second end, the individual wrinkles are unfolded until the therapeutic device is atraumatically removed (e.g., peeled) from the surrounding tissue of the patient.

A therapeutic device substantially similar to therapeutic devices 100 and 300 may be utilized. The therapeutic device includes the pouch 102 and the removal element 114 attached thereto. The pouch 102 extends from the first end 130 to the second end 132. The pouch 102 includes the first composite layer 104 and the second composite layer 106. The reservoir 108 is formed between the first and second composite layers 104, 106. The reservoir 108 is a contained space where cells are housed and is accessible by port(s) 107, which is in fluid communication with the reservoir 108. The periphery 110 of the pouch 102 is sealed to the location of the port(s) 107. In an exemplary embodiment, the hollow lumen 112 extends through the pouch 102, as depicted in FIG. 2. The removal element 114 of the therapeutic device 100 is attached to the first end 130 of the pouch 102 for atraumatic removal of the therapeutic device by eversion.

Similar to therapeutic device 300, a plurality of wrinkles 350 is incorporated into the therapeutic device. In such an embodiment, each of the first and second composite layers 104, 106 includes a plurality of wrinkles 350. Because the first and second composite layers 104, 106 include these wrinkles, the therapeutic device is movable, in the body of the patient, between a relaxed state, in which the plurality of wrinkles extend in a direction generally perpendicular to a longitudinal axis L of the therapeutic device, and an extended state, in which the plurality of wrinkles are stretched between the first end 130 and the second end 132 so as to be generally parallel with the longitudinal axis of the therapeutic device.

The first and second composite layers 104, 106 may be formed in the same manner as, and have the same characteristics of, the first and second composite layers 104, 106, described herein with respect to FIGS 1-6. In some embodiments, that first composite layer 104 is a composite layer that includes the cell permeable layer 116 and the cell retentive layer 118. In some embodiments, the second composite layer 106 includes the cell permeable layer 120 and cell retentive layer 122. The cell permeable layers 116, 120 and the cell retentive layers 118, 122 may be formed in the same manner as, and have the same characteristics of, the cell permeable layers 116, 120 and the cell retentive layers 118, 122, respectively, described herein with respect to FIGS. 1-6.

The reservoir 108 is formed between the first composite layer 104 and the second composite layer 106 of the therapeutic device and is a contained space configured to hold cells 136. The reservoir 108 may be formed in the same manner as, and have the same characteristics of, the reservoir 108, described herein with respect to FIGS. 1-6.

In at least one embodiment where the therapeutic device is used, the therapeutic device is implanted within a pocket of tissue 138 of the patient. The therapeutic device may be implanted into the patient prior to or after the introduction of the cells 136. When removal is deemed necessary or warranted, the therapeutic device is removed from the tissue of the patient by application of a tangential force to minimize or avoid trauma to the surrounding tissue of the patient. Specifically, the removal element 114 is engaged by the device removal tool 140 through the lumen 112, similar to the manner as depicted in FIG. 3. A tensile force is exerted on the removal element 114 by the device removal tool 140 such that the first end 130 of the pouch 102 is pulled into the lumen 112 toward the second end 132 of the pouch 102, similar to the manner as depicted in FIG. 18. Concurrently, a first micro-wrinkle closest to the first end 530 unfolds, as depicted in FIG. 4. As the device removal tool 140 is pulled further through the lumen 112 such that the first end 130 follows the device removal tool 140 through the lumen 112 towards the outside of the pouch 102, each individual micro-wrinkle 350 is unfolded, from the first end 130 to the second end 132, until the pouch 102 is atraumatically peeled from the surrounding tissue of the patient and is finally everted through the lumen 112, similar to the manner depicted in FIG. 5. Thus, the therapeutic device of this embodiment may allow for greater device efficacy due to the increased surface area of the plurality of wrinkles 350 while also employing an eversion removal technique to minimize trauma to the surrounding tissue.

VI. Bio-Absorbable Materials

In some embodiments, one or both composite layers of the described therapeutic devices is or includes a bio-absorbable material. The bio-absorbable material may be formed as a solid (molded, extruded, or crystals), a self-cohered web, a raised webbing, or a screen. In some embodiments, one or more layers of bio-absorbable material are attached to a non-bio-absorbable material having macroscopic porosity to allow for cell permeation (e.g., a cell permeable layer) to form a composite. In other embodiments, a non-bio-absorbable material having microscopic porosity to decrease or prevent cell permeation is releasably attached to the porous self-cohered web to permit atraumatic removal of the therapeutic device 100, 300 from the patient days following implantation. Resorbing into the patient can promote favorable type 1 collagen deposition, neovascularization, and a reduction of infection. Furthermore, in some embodiments, the cell permeable layers may be made of a bioasorbable material that is tailorable to resorb at the rate of when explantation of the therapeutic device is needed, thus easing removal because the ingrowth of tissue into the therapeutic device would not be as significant.

Non-limiting examples of suitable bio-absorbable materials include, but are not limited to, polyglycolide:trimethylene carbonate (PGA:TMC), polylactic acid, polyglycolic acid, poly (glycolide), poly(lactide-co-caprolactone), poly (caprolactone), poly(carbonates), poly(dioxanone), poly(hydroxybutyrates), poly(hydroxyvalerates), poly(hydroxybutyrates-co-valerates) and copolymers and blends thereof.

What is claimed is:

1. A cell encapsulation device comprising:
   a pouch comprising:
      opposed first and second ends;
      first and second composite layers extending between the opposed first and second ends, wherein the first composite layer includes:
         a first cell permeable layer extending between the opposed first and second ends; and
         a first cell retentive layer extending between the opposed first and second ends;
      wherein the second composite layer includes:
         a second cell permeable layer extending between the opposed first and second ends,
         a second cell retentive layer extending between the opposed first and second ends, and
         a lumen extending through the cell encapsulation device from the first end to the second end;
      a reservoir positioned between the first and second composite layers, the reservoir contacting the first cell retentive layer;
      at least one port in fluid communication with the reservoir; and
      a removal element that is attached to or is integral with the first end of the pouch and extends from the first end into the lumen to be accessible by a device removal tool such that during use the device removal tool inserted into the lumen from the second end of the pouch grasps the removal element to exert a force on the removal element through the lumen to cause the device to be removed by eversion.

2. The device of claim 1, wherein each of the first and second composite layers comprises a plurality of wrinkles.

3. The device of claim 1, wherein the first cell permeable layer has a pore size sufficient to permit growth of vascular tissue therethrough.

4. The device of claim 3, wherein the pore size is greater than 5.0 microns as measured by porometry.

5. The device of claim 1, wherein the first cell retentive layer has a pore size sufficient to prevent ingrowth of vascular tissue.

6. The device of claim 5, wherein the pore size is less than 1 micron, as measured by porometry.

7. The device of claim 1, wherein at least one of the first cell permeable layer and the first cell retentive layer comprises an expanded fluoropolymer.

8. The device of claim 1, wherein the removal element comprises a pull tab.

9. The device of claim 1, wherein the removal element is positioned within the lumen proximate to the first end such that a majority of the reservoir is unobstructed by the removal element.

10. The device of claim 1, wherein the removal element is positioned within the lumen proximate to the first end such that a majority of the first and second composite layers are substantially uncovered by the removal element.

* * * * *